US008989944B1

(12) United States Patent
Agarwal et al.

(10) Patent No.: US 8,989,944 B1
(45) Date of Patent: Mar. 24, 2015

(54) METHODS AND DEVICES FOR DETERMINING MOVEMENTS OF AN OBJECT IN AN ENVIRONMENT

(71) Applicant: Google Inc., Mountain View, CA (US)

(72) Inventors: Pratik Agarwal, Mountain View, CA (US); Jiajun Zhu, Mountain View, CA (US); Dmitri Dolgov, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/090,308

(22) Filed: Nov. 26, 2013

(51) Int. Cl.
| G06F 17/00 | (2006.01) |
| G08G 1/16 | (2006.01) |
| G01S 13/87 | (2006.01) |
| G01S 13/93 | (2006.01) |
| G01S 13/86 | (2006.01) |
| G01S 13/72 | (2006.01) |

(52) U.S. Cl.
CPC ............. *G08G 1/166* (2013.01); *G01S 13/87* (2013.01); *G01S 13/931* (2013.01); *G01S 13/86* (2013.01); *G01S 13/723* (2013.01); *G01S 13/876* (2013.01)
USPC .......... 701/23; 340/425.5; 340/435; 340/576; 701/2; 701/28; 345/7

(58) Field of Classification Search
CPC ... G01S 13/723; G01S 136/87; G01S 13/931; G01S 13/86; G01S 13/867
USPC ............... 701/23, 2, 28; 340/425.5, 435, 576; 345/7
See application file for complete search history.

(56) References Cited

U.S. PATENT DOCUMENTS

| 5,068,654 | A | 11/1991 | Husher | |
| 7,764,231 | B1* | 7/2010 | Karr et al. | 342/457 |
| 8,344,894 | B2* | 1/2013 | Szczerba et al. | 340/576 |
| 8,346,480 | B2 | 1/2013 | Trepagnier et al. | |
| 8,395,529 | B2* | 3/2013 | Seder et al. | 340/905 |
| 8,564,502 | B2* | 10/2013 | Cui et al. | 345/7 |
| 2009/0018712 | A1* | 1/2009 | Duncan et al. | 701/2 |
| 2010/0253489 | A1* | 10/2010 | Cui et al. | 340/425.5 |
| 2010/0253526 | A1* | 10/2010 | Szczerba et al. | 340/576 |
| 2010/0253541 | A1* | 10/2010 | Seder et al. | 340/905 |
| 2012/0046820 | A1 | 2/2012 | Allard et al. | |

(Continued)

OTHER PUBLICATIONS

Barth et al., Where Will the Oncoming Vehicle be the Next Second?, 2008, IEEE, p. 1068-1073.*

(Continued)

*Primary Examiner* — McDieunel Marc
(74) *Attorney, Agent, or Firm* — McDonnell Boehnen Hulbert & Berghoff LLP

(57) ABSTRACT

An example method may include receiving a first set of points based on detection of an environment of an autonomous vehicle during a first time period, selecting a plurality of points from the first set of points that form a first point cloud representing an object in the environment, receiving a second set of points based on detection of the environment during a second time period which is after the first period, selecting a plurality of points from the second set of points that form a second point cloud representing the object in the environment, determining a transformation between the selected points from the first set of points and the selected points from the second set of points, using the transformation to determine a velocity of the object, and providing instructions to control the autonomous vehicle based at least in part on the velocity of the object.

19 Claims, 11 Drawing Sheets

(56) References Cited

U.S. PATENT DOCUMENTS

2012/0203418 A1     8/2012   Braennstroem et al.
2014/0236414 A1*   8/2014   Droz et al. .................... 701/28

OTHER PUBLICATIONS

Faezipour et al., Progress and Challenges in Intelligent Vehicle Area Networks, 2012, Internet, p. 90-100.*

* cited by examiner

T = T1

Top View

Top View

Top View

ΔT = T2 - T1

METHODS AND DEVICES FOR DETERMINING MOVEMENTS OF AN OBJECT IN AN ENVIRONMENT

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller may adjust the directional controls of the vehicle to cause the vehicle to navigate around the obstacle.

SUMMARY

Within examples, methods and systems are provided for determining movements of objects within an environment, such as an environment of an autonomous vehicle. A first set of points may be received based on detection of the environment during a first time period. Certain points from the first set may be selected to form a point cloud representing an object in the environment. A second set of points may then be received based on detection of the environment during a second time period after the first time period. Certain points from the second set may be selected to form a second point cloud representing the object. A transformation between the selected points from the first set and the selected points from the second set may then be determined and used to determine a velocity of the object. Instructions may then be provided to control the vehicle based on the velocity of the object.

In a first aspect, a method is provided. The method may include receiving a first set of points based on detection of an environment of an autonomous vehicle during a first time period, selecting a plurality of points from the first set of points that form a first point cloud representing an object in the environment, receiving a second set of points based on detection of the environment during a second time period which is after the first period, selecting a plurality of points from the second set of points that form a second point cloud representing the object in the environment, determining a transformation between the selected points from the first set of points and the selected points from the second set of points, using the transformation to determine a velocity of the object, and providing instructions to control the autonomous vehicle based at least in part on the velocity of the object.

In a second aspect, a vehicle is provided. The vehicle may include a control system configured to receive a first set of points based on detection of an environment by a depth sensor on the vehicle during a first time period, select a plurality of points from the first set of points that form a first point cloud representing an object in the environment, receive a second set of points based on detection of the environment by the depth sensor during a second time period which is after the first time period, select a plurality of points from the second set of points that form a second point cloud representing the object in the environment, determine a transformation between the selected points from the first set of points and the selected from the second set of points, and use the transformation to determine a velocity of the object.

In a third aspect, a non-transitory computer readable medium having stored therein instructions that when executed by a computing system, cause the computing system to perform functions is disclosed. The functions may include receiving a first set of points based on detection of an environment of an autonomous vehicle during a first time period, selecting a plurality of points from the first set of points that form a first point cloud representing an object in the environment, receiving a second set of points based on detection of the environment during a second time period which is after the first period, selecting a plurality of points from the second set of points that form a second point cloud representing the object in the environment, determining a transformation between the selected points from the first set of points and the selected points from the second set of points, using the transformation to determine a velocity of the object, and controlling the autonomous vehicle based at least in part on the velocity of the object.

In a fourth aspect, example systems may provide means for receiving a first set of points based on detection of an environment of an autonomous vehicle during a first time period, means for selecting a plurality of points from the first set of points that form a first point cloud representing an object in the environment, means for receiving a second set of points based on detection of the environment during a second time period which is after the first period, means for selecting a plurality of points from the second set of points that form a second point cloud representing the object in the environment, means for determining a transformation between the selected points from the first set of points and the selected points from the second set of points, means for using the transformation to determine a velocity of the object, and means for providing instructions to control the autonomous vehicle based at least in part on the velocity of the object.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
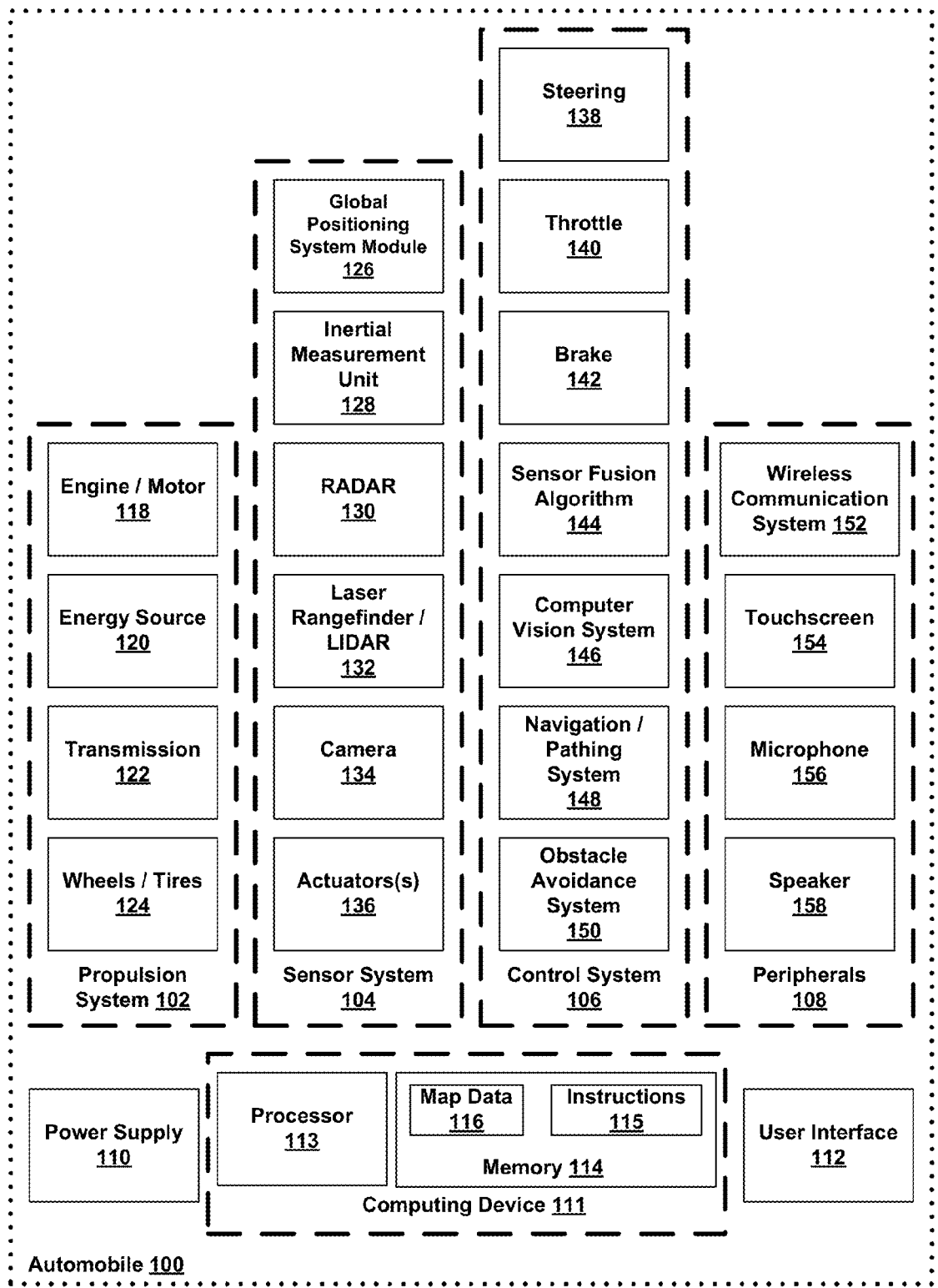
FIG. 1 is a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

An autonomous vehicle may contain a system configured to provide instructions to the vehicle so that the vehicle may avoid objects in the environment. The system may provide notifications about positions and movements of nearby objects to the vehicle's control systems with a low enough latency that objects can be avoided (e.g., by stopping the vehicle or steering around an object). Additionally, it may be desirable for an example system to operate with both a low false negative rate (e.g., successfully avoiding objects when a corrective action is needed) and a low false positive rate (e.g., refraining from unnecessary braking or swerving).

Some environments that an autonomous vehicle travels through may contain both stationary objects such as cones or flares as well as moving objects such as other vehicles. In order to avoid moving objects, the system can be configured to control the vehicle using decisions based on actions and/or movements of objects within the environment. In particular, the velocity of a moving object within the environment may be determined in order to predict the likelihood that the current motion path of the object may cross the current motion path of the autonomous vehicle. In some examples, the velocity of a moving object may be determined as a vector, which may include determining the heading of the moving object and/or the position or projected position of the object at particular points in time.

Some systems may attempt to identify particular features of moving objects within the environment, such as center points or corners of the objects. However, these systems may not function well when the view of an object from the autonomous vehicle changes rapidly, such as when the object is very close or has a large relative velocity.

Example embodiments may be used to determine movements of objects within an environment using full sets of points available based on detection of the objects with a sensor or group of sensors. Objects may first be identified at a first timestamp by piecing together points received based on detection of the environment by one or more depth sensors. Example depth sensors may include cameras (e.g., time-of-flight cameras or stereo cameras), radio detection and ranging (RADAR) units, or laser rangefinder and/or light detection and ranging (LIDAR) units.

In some examples, points received based on detection of a ground surface within the environment may first be filtered out. Then, the remaining points may be stitched together into point clouds representing separate objects using a process referred to as "segmentation." The segmentation process may be performed in a number of different ways. In one example, three-dimensional distances between the points may be determined, and points close to one another may be identified as belonging to particular objects. In additional examples, identifying features of the objects (e.g., color, size and/or dimension, reflectivity, etc.) may be used in the segmentation process as well or instead.

A second set of points may then be received based on detection of the environment by one or more sensors at a second timestamp. The sensor(s) may be the same as those used to determine the first set of points, or they may be different. The time difference between the first timestamp and the second timestamp may be a number of different possible amounts (e.g., 1 millisecond, 100 milliseconds, 1 second), and may depend on the capability of the type of sensor(s) being used.

The segmentation process may then be carried out again using the second set of points. An object which was identified at the first timestamp within the first set of points may be identified again within the second set of points. Points may then be selected from the second set points such that they form a second point cloud representing the object. For instance, the previous location of the object and/or identifying features of the object may be used to determine that an object detected within the second set of points is the same as an object detected in the first set of points.

A transformation between the points representing the object from the first set of points and the points representing the object from the second set of points may then be determined. In particular, using a process referred to as "scan matching," a transformation may be determined that indicates an amount of translation and/or rotation that would make the points from the first set best match up within the points from the second set. A number of different possible scan matching algorithms could be used, such as iterative closest point (ICP), which iteratively minimizes the distances between points from the first set and nearby associated points from the second set.

The transformation between the points from the first set and the points from the second set may then be used to determine a velocity of the object, which may include a translational velocity and/or an angular velocity. Other parameters may be determined as well, such as the object's directional heading or the object's position at a particular point in time. In another example, one or more additional scans of the environment may be used to determine an object's acceleration by determining a rate of change of the object's velocity (e.g., whether it is speeding up or slowing down). In a further example, the same process may be used for multiple objects in the environment simultaneously, which may include both moving and stationary objects within an environment.

In some examples, movements of objects within an environment may be determined in order to help steer an autonomous vehicle. For instance, objects may be avoided while also preventing unnecessary braking for objects that are unlikely to cross the path of the autonomous vehicle. In additional examples, by determining the full set of available points representing an object, avoiding objects can be done using contour outlines representing the objects, which may be more precise than using abstract shape representations such as rectangles or boxes. Example systems and methods could be used by other moving computing devices as well, such as a self-guided robot that is operating in an environment with moving and static objects.

Example methods to avoid objects may also be used as a backup or failsafe system. For instance, an autonomous vehicle may contain multiple sensors of the environment. Data from each of the sensors may be received and combined by computing systems on the autonomous vehicle to follow objects in the environment. However, such systems that combine data from multiple sensors may be complicated and have high latency. Therefore, a separate process may be run separately using the data from each individual sensor using the lower latency methods described herein. Each individual sensor may separately communicate with a notification system that may help the vehicle avoid objects in the environment. For instance, each sensor may be able to send a stop signal that causes the vehicle to immediately activate its brakes.

Utilizing the methods and systems described herein may therefore facilitate the task of determining movements of objects within an environment of an autonomous vehicle in order to direct the vehicle, such as to avoid paths of objects in the environment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The computing device 111 may be a controller, or part of the controller, of the automobile 100. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
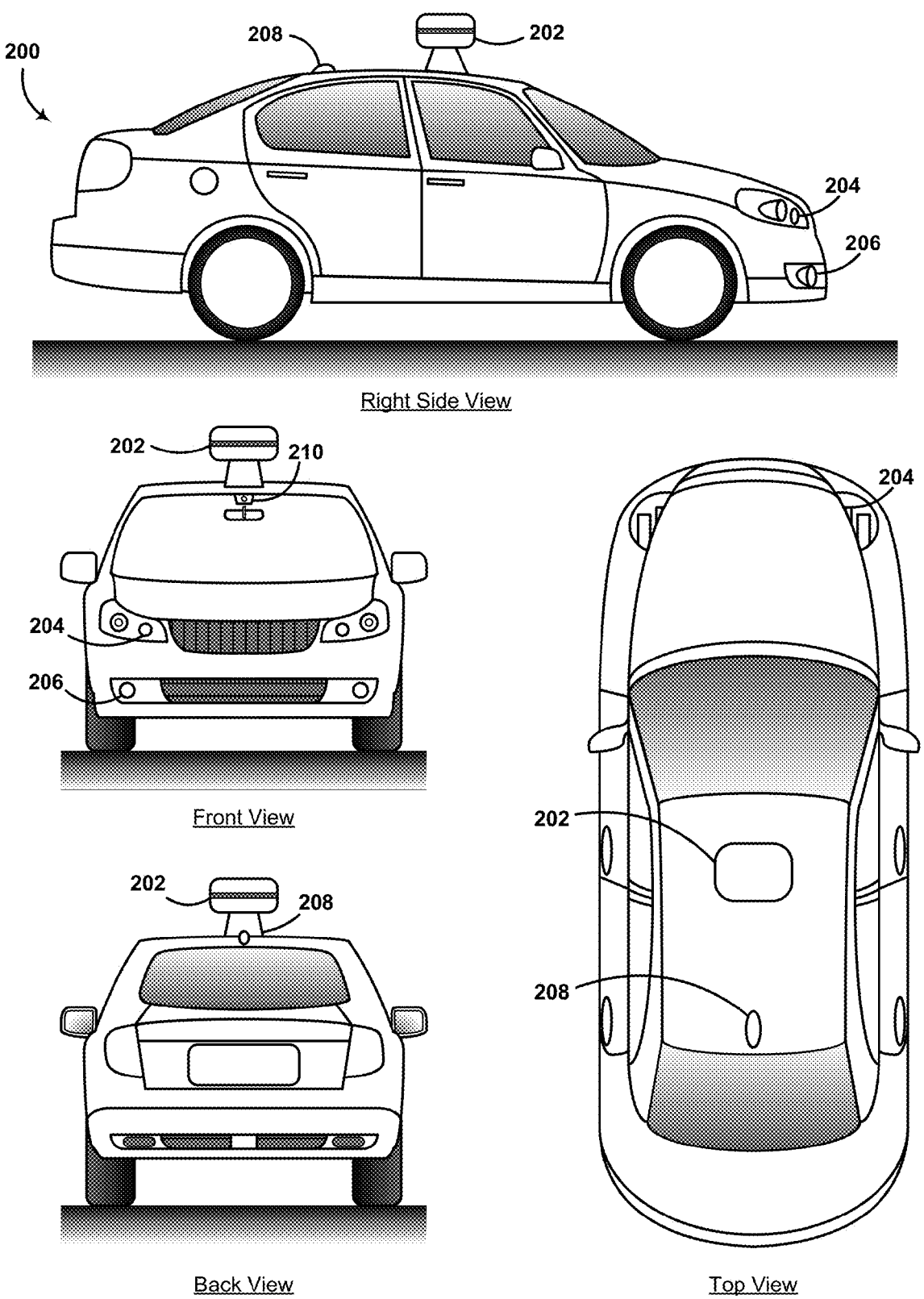
FIG. 2 is a vehicle, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
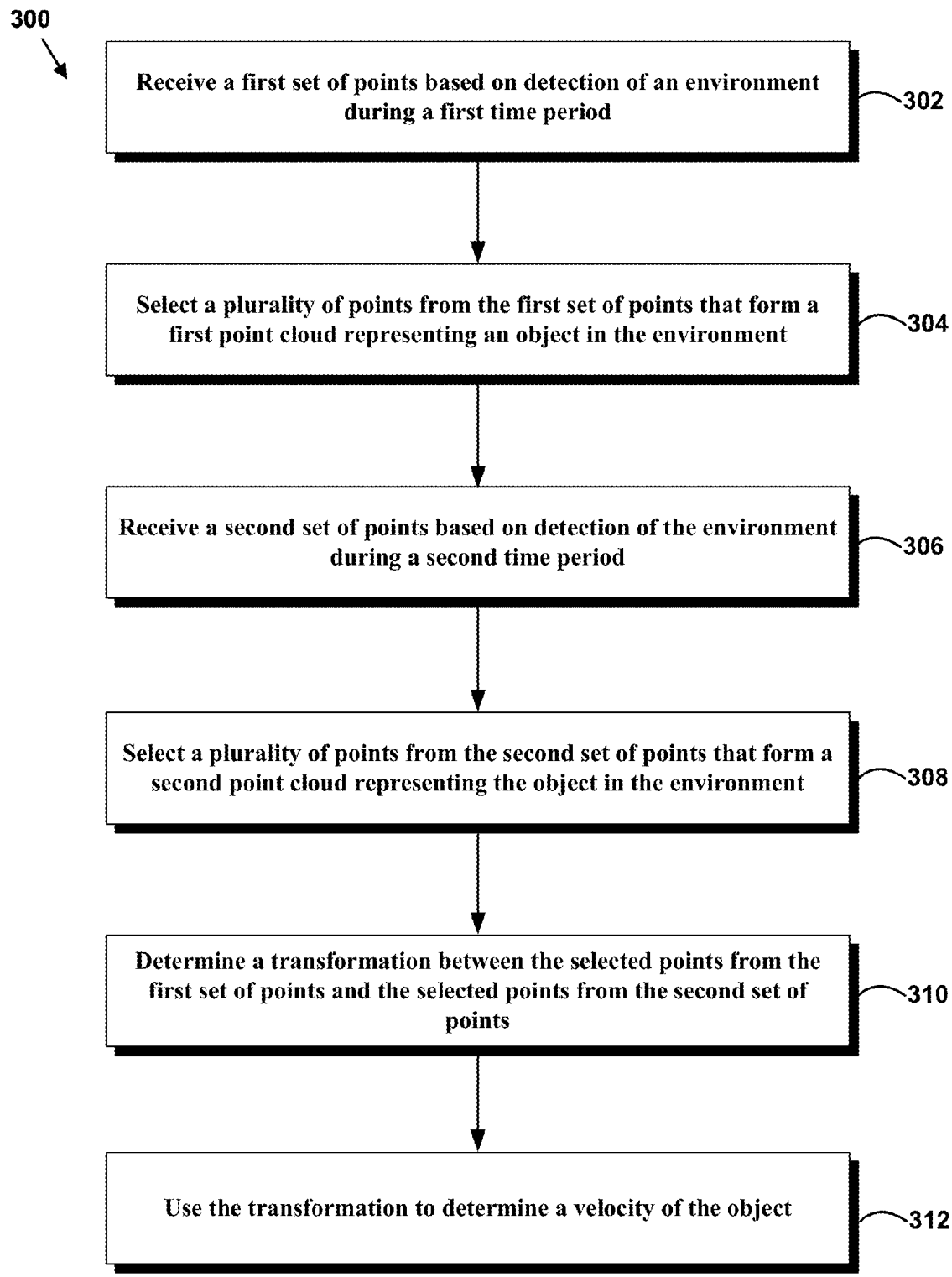
FIG. 3 illustrates a block diagram of a method, in accordance with an example embodiment.

In FIG. 3, a method 300 is provided for determining movements of an object within an environment. In some examples, method 300 may be carried out by a vehicle such as vehicle 100 and/or vehicle 200 as illustrated and described in reference to FIGS. 1 and 2, respectively. For example, the processes described herein may be carried out by a RADAR unit 130, a laser rangefinder and/or LIDAR unit 132, and/or a camera 134 mounted to an autonomous vehicle in communication with a control system 106, a sensor fusion algorithm 144, a computer vision system 146, a navigation system 148, and/or an obstacle avoidance system 150. Additionally, method 300 may be carried out using sensor data from one or more sensors on an autonomous vehicle (e.g., vehicle 200) such as sensors 202, 204, 206, and/or camera 210 as shown in FIG. 2.

It should be understood that while method 300 is described here as being carried out by a computing system of an autonomous vehicle or a server system in contact with such a vehicle, the method could also be used in a number of different applications that may benefit from determining movements objects within an environment. For instance, method 300 could be used by a different type of autonomous vehicle or robot, or by a human driver assistance system. Other possible applications exist as well.

Furthermore, it is noted that the functionality described in connection with the flowcharts described herein can be implemented as special-function and/or configured general-function hardware modules, portions of program code executed by a processor (e.g., the processor 113 within computing device 111) for achieving specific logical functions, determinations, and/or steps described in connection with the flowchart shown in FIG. 3. Where used, program code can be stored on any type of computer-readable medium (e.g., computer-readable storage medium or non-transitory media, such as memory 114 described above with respect to computing device 111 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Figure 4A:
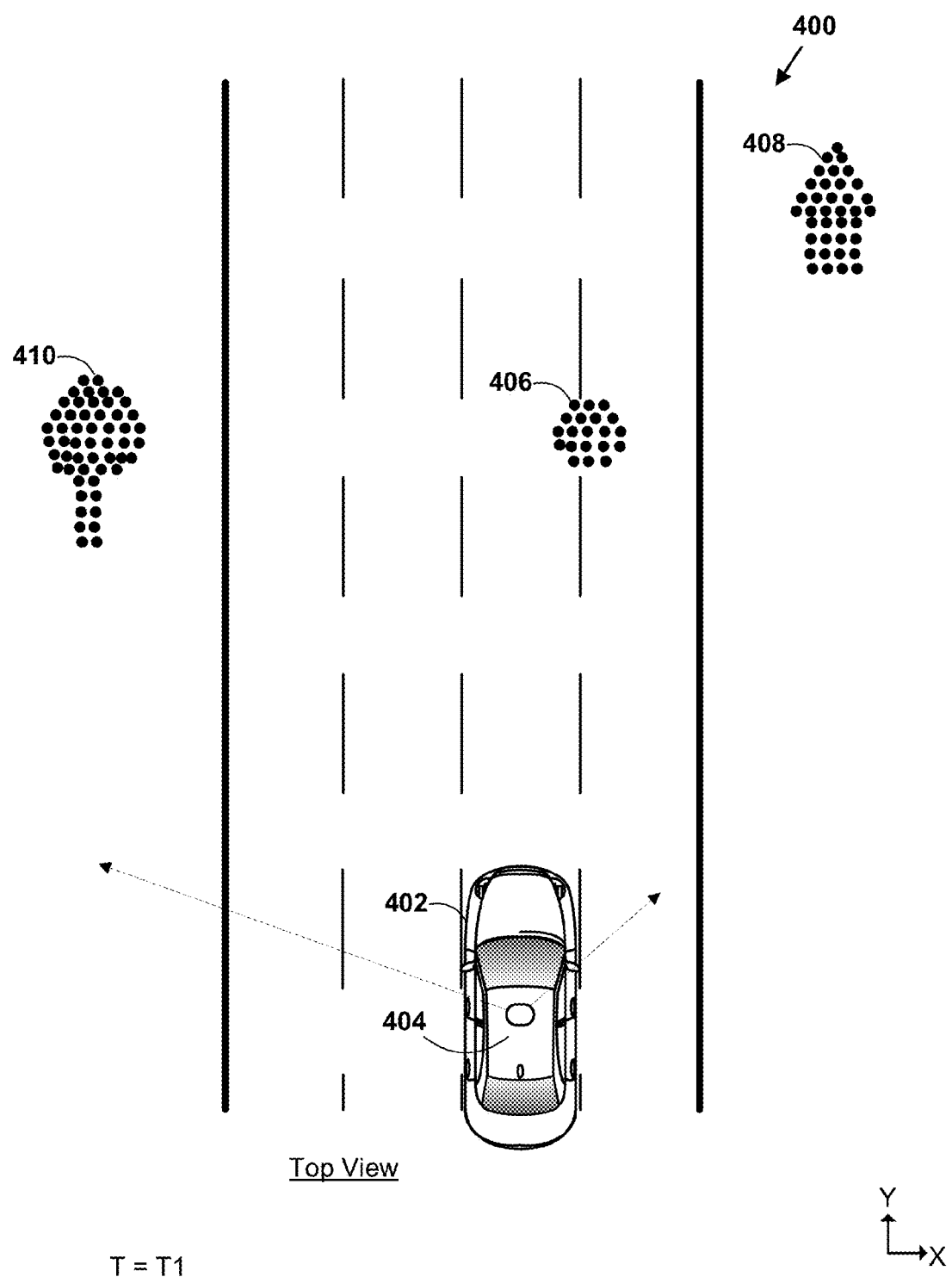
FIG. 4A is a top view of points received based on detection of an environment during a first time period, in accordance with an example embodiment.

As shown by block 302 of FIG. 3, method 300 may initially involve receiving a first set of points based on detection of an environment during a first time period. FIG. 4A illustrates a first set of points, in accordance with an example embodiment. As shown, an autonomous vehicle 402 may be operating within an environment 400 using one or more depth sensor(s) 404. For instance, the depth sensor(s) 404 may include a RADAR unit configured to transmit pulses of radio waves or microwaves that may bounce off any object in a path of the waves. The depth sensor(s) 404 may additionally include a LIDAR unit with a laser source and/or laser scanner configured to emit laser pulses and a detector configured to receive reflections of the laser pulses. The depth sensor(s) 404 may also include one or more cameras (e.g., a still camera, a video camera, etc.) configured to detect visible light, infrared light, or ultraviolet light. The camera may be a range detector configured to generate a two-dimensional image indicating a distance from the camera to a number of points in the environment 400, for example. Other types of depth sensors may be used as well or instead. Additionally, the depth sensor(s) 404 may be placed at alternative locations on the vehicle 404 than shown in FIG. 4A.

Sensor data from the depth sensor(s) 404 may be used to determine three-dimensional (3D) points representing locations of detected features within the environment 400. In particular, points may be determined based on detection of physical objects within the environment 400, such as a ball 406, a building 408, and a tree 410. The different objects and features of the environment 400 may all be detected simultaneously during the first time period (T1) or the points may represent a combination of all detected aspects during a certain time window. For instance, T1 may span 1 millisecond or 10 milliseconds or 1 second.

Figure 4B:
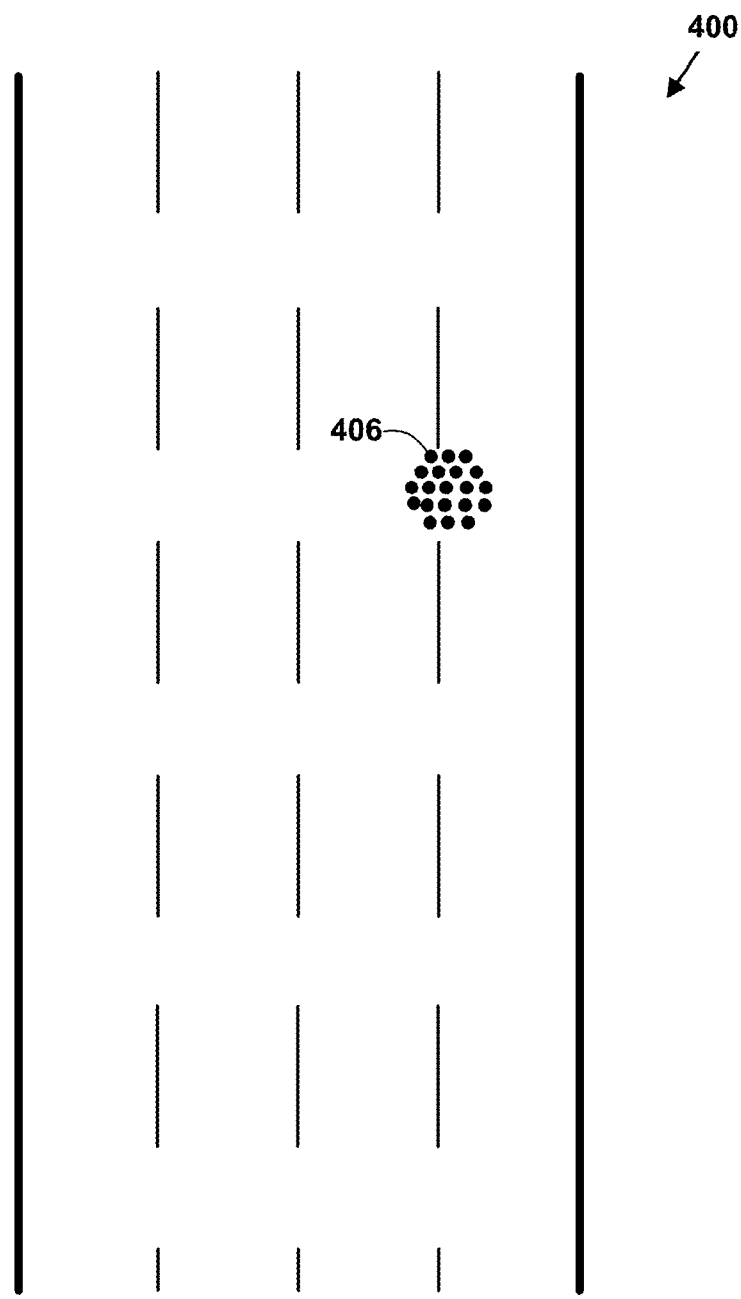
FIG. 4B is a schematic illustration of selecting points from FIG. 4A that form a point cloud representing an object in the environment, in accordance with an example embodiment.
Figure 4B:
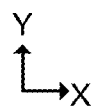

As shown by block 304 of FIG. 3, method 300 may then involve selecting points from the first set of points that form a point cloud representing an object in the environment. FIG. 4B shows a point cloud representation of a particular object in the environment, in accordance with an example embodiment. Using a process referred to as "segmentation," the set of points representing the environment may be divided into point clouds representing individual objects. This process may involve stitching multiple points together to form separate point clouds, which may be done using a variety of methods.

In some examples, a number of points within the environment 400 may have been determined based on detection of a ground surface in the environment. These points may be filtered out from the first set of points before stitching the remaining points into point clouds representing objects in the environment. For instance, in some examples, only points which could be part of a physical object may be considered for purposes of segmentation. In other examples, points representing other background aspects (such as water or the sky) could be filtered out as well.

The remaining points may then be stitched together to form point cloud representations of objects. A point cloud may include a set of vertices in a 3D coordinate system. These vertices may be defined by X, Y, and Z coordinates, for example, and may represent an external surface of an object. For example, FIG. 4B shows points stitched together representing a ball 406 within the environment 400. One method of segmentation may involve determining three-dimensional distances between adjacent pairs of points. If adjacent pairs of points are close enough together (e.g., the distance between them is less than a threshold distance), it may be determined that the points belong to a point cloud representing the same object. In some examples, identifying properties of objects may be used in the segmentation process as well. For example, it may be determined that the ball 406 has a red color (e.g., based on previously captured sensor data). Accordingly, points with different colors may be identified as belonging to point clouds representing other objects in the environment. Other properties of objects such as size or dimensions may be used in some examples as well.

In further examples, a point cloud may instead be a two-dimensional representation of an object. For instance, a 2D point cloud may represent all of the points from the object projected onto the ground plane or a different 2D plane, which may allow for faster scan matching in some examples.

Figure 4C:
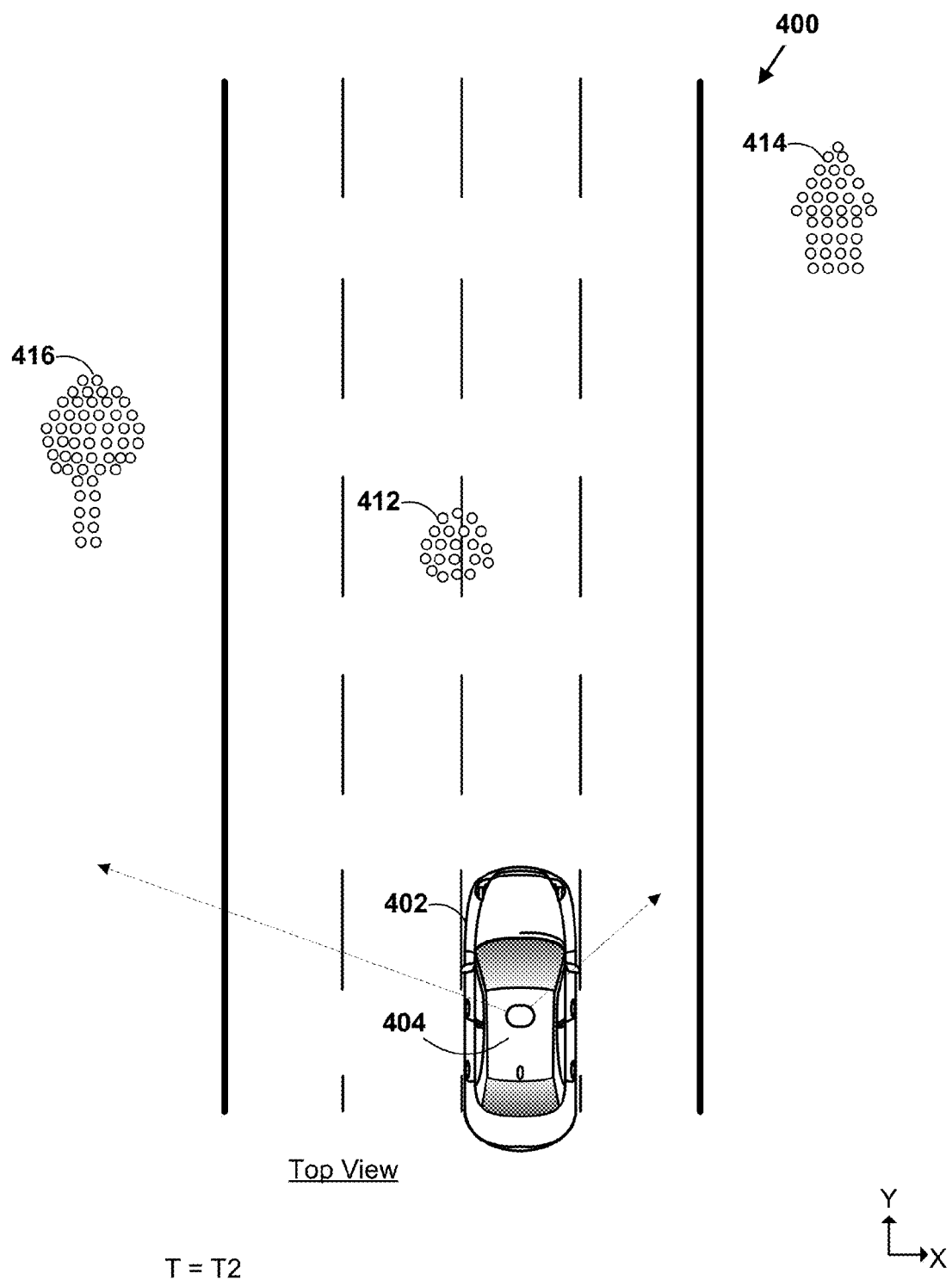
FIG. 4C is a top view of points received based on detection of an environment during a second time period, in accordance with an example embodiment.

As shown by block 306 of FIG. 3, method 300 may then involve receiving a second set of points based on detection of the environment during a second time period. FIG. 4C is a top view of a second set of points, in accordance with an example embodiment. In some examples, the second set of points may be determined using the same sensor(s) used to determine the first set of points. In other examples, different sensors may be used. For instance, a first type of sensor (e.g., a RADAR unit) may be used to determine the first set of points and a second type of sensor (e.g., a LIDAR unit) may be used to determine the second set of points. In further examples, different combinations of sensor(s) may be used to determine some or all of the points from the first and/or second set of points as well.

The second set of points may be determined based on sensor data received during a second time period (T2). The second time period may occur immediately after the first time period ends or there may be some lag time in between (e.g., 1 millisecond or 100 milliseconds). All of the points determined during T2 may be based on simultaneous detection of the environment 400, or they may be added together over a certain duration (e.g., 1 second), which may be the same length of time or a different length of time as T1. Within examples, some time gap may be used between T1 and T2 to show movement of an object in the environment in FIG. 4C for illustration purposes. But shorter time periods could be used in practice as well.

As shown in FIG. 4C, the second set of points may include points received based on detection of physical objects with the environment 400, such as a ball 412, a building 414, or a tree 416. The objects detected during the second time period may or may not include all of the objects detected during the first time period (e.g., in some examples, an object may have moved out of range of a sensor). Additionally, new objects may appear for the first time during the second time period as well.

Figure 4D:
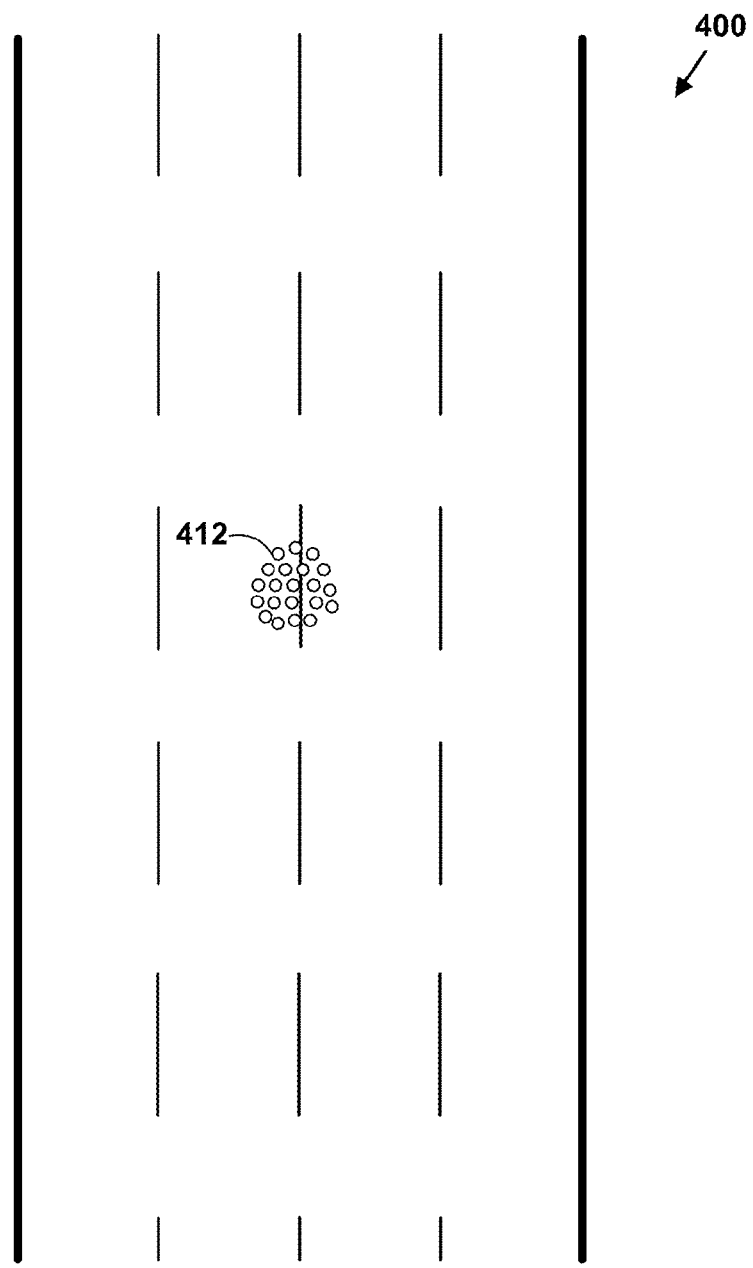
FIG. 4D is a schematic illustration of selecting points from FIG. 4C that form a point cloud representing the object from FIG. 4B in the environment, in accordance with an example embodiment.
Figure 4D:
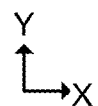

As shown by block 308 of FIG. 3, method 300 may then involve selecting points from the second set of points that form a second point cloud representing the object previously identified from the first set of points. FIG. 4D shows a second point cloud representation of the object using points from the second set of points, according to an example embodiment. The segmentation process may be repeated to divide the second set of points into point clouds representing objects. In some instances, a same object identified from the first set of points may again be identified within the second set of points. For instance, as shown in FIG. 4D, a point cloud representing a ball 412 may be identified, which may be the same ball 406 identified previously, but at a different location. Identifying characteristics of the object such as color or size as well as the relative location of the object may be used to verify that a same object from the first set of points has been identified within the second set of points.

As shown by block 310 of FIG. 3, method 300 may then involve determining a transformation between the selected points from the first set of points and the selected points from the second set of points. A process referred to as "scan matching" may be used to match the points making up the first point cloud with the points making up the second point cloud. In particular, an amount of translation and/or an amount of rotation may be determined to align the first point cloud with the second point cloud.

The scan matching process may be completing using a number of different algorithms. One example algorithm includes iterative closest point (ICP), which iteratively revises the translation and/or rotation needed to minimize the distance between the two groups of points. In particular, points from the first group are associated with corresponding points from the second group by finding a point from the second group that is closest to each point in the first group. Then, a rotation and/or translation is estimated that minimizes distances between points from the first group and corresponding points from the second group. For example, the mean squared error between the two groups of points may be minimized. The first group of points may then be transformed using the estimated rotation and/or translation. In some examples, the process may then be performed iteratively (e.g., determining revised corresponding points from the two groups and estimating additional rotations and/or translations to further minimize a distance between the first group of points and the second group of points) one or more times in order to improve the match. Different variations on the ICP algorithm may be used in some examples as well.

Figure 4E:
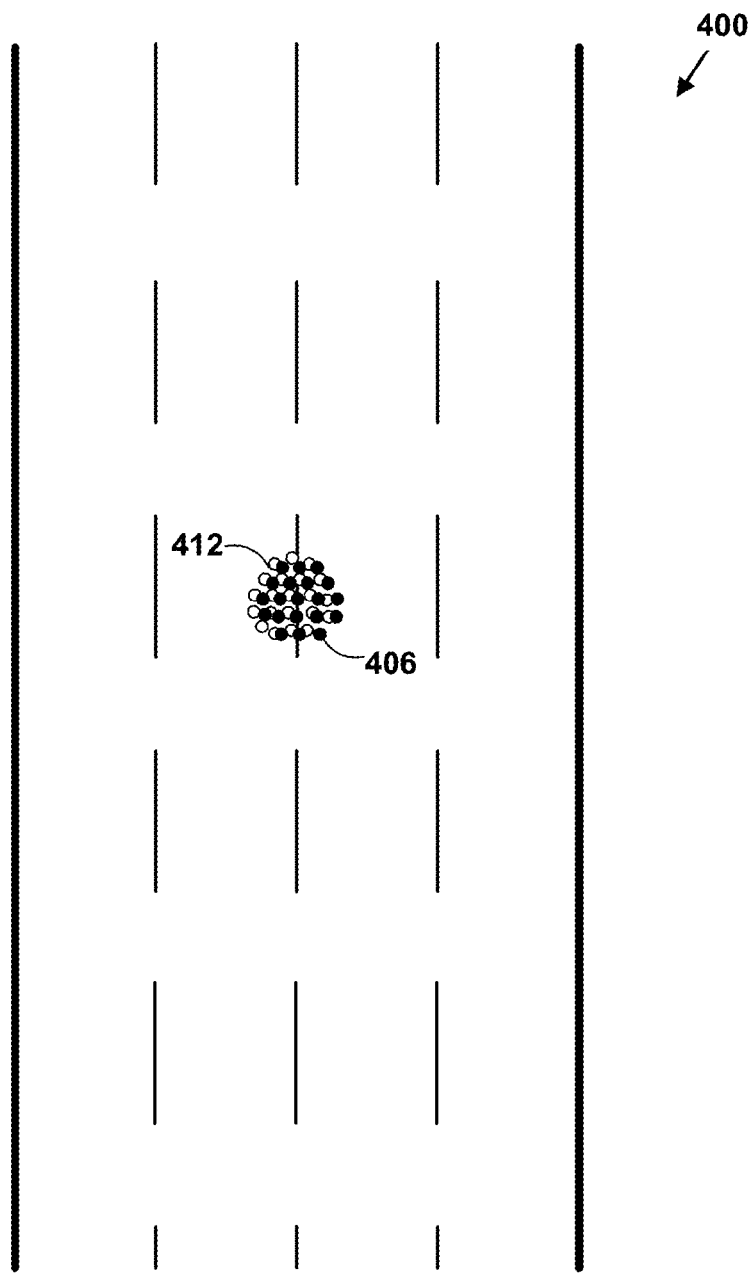
FIG. 4E is a schematic illustration of determining a transformation between the selected points form FIG. 4B and the selected points from FIG. 4D, according to an example embodiment.

FIG. 4E shows an example transformation from a first point cloud representing an object to a second point cloud representing the object, according to an example embodiment. As shown, the group of points 406 from the first set of points representing a ball within the environment 400 may transformed to align with the group of points 412 from the second set of points representing the same ball. In some examples, the two groups of points may be identical representations of the object at different locations in the environment, in which case a transformation may be determined to match the two groups exactly. In practice, the two groups of points will likely be at least slightly different representations of the object, in which case a transformation may be determined to match the two groups in a way that minimizes a distance between them. For example, ICP or a related algorithm may be used to determine the transformation. An example transformation may result in an alignment between the two groups of points as shown in FIG. 4E.

As shown by block 312 of FIG. 3, method 300 may then involve using the transformation to determine a velocity of the object. In particular, the translation and/or rotation making up the transformation may be used to determine a translational and/or angular velocity of the object by dividing the magnitude of the translation and/or rotation by the time difference between when the two groups of points were received. The velocity may be determined as a vector, which may be used to determine other attributes about the object's motion as well. For instance, the direction of the velocity vector may be used to determine a translational and/or rotational heading of the object. Additionally, the velocity may be used to determine a position of the object (e.g., during the first time period or during the second period), or to make predictions about a future position of the object (e.g., where the object will be located in 1 second or in 5 seconds).

Figure 4F:
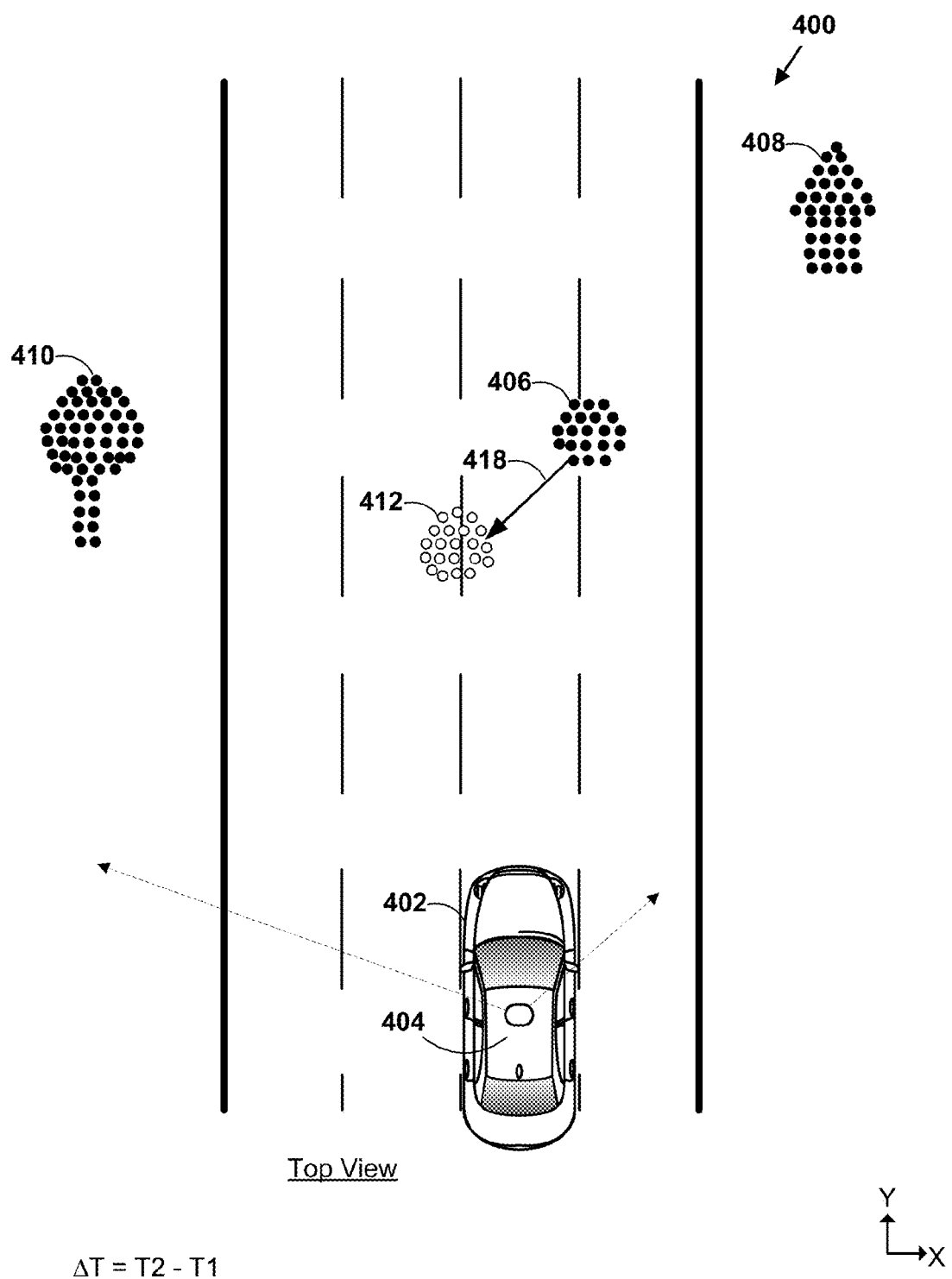
FIG. 4F is a schematic illustration of using the transformation from FIG. 4E to determine a velocity of the object, according to an example embodiment.

FIG. 4F shows the determination of an object's velocity using the transformation from FIG. 4E, according to an example embodiment. As shown, the transformation between the first group of points 406 representing the object and the second group of points 412 representing the object may result in a vector 418 through the environment 400. For illustration purposes, the vector here only shows translational motion, but the transformation could also involve rotation around one or more axes as well. By dividing the magnitude of the vector 418 by a time difference between when the two groups points were received (e.g., T2–T1), a velocity vector of the object may be determined. Additionally, the direction of the velocity vector may be used to determine a heading of the ball within the environment 400, for example.

In some examples, additional scans of the environment may be used to refine metrics regarding movements of objects within an environment and/or to determine other types of metrics. For instance, two or more consecutive velocity vectors of an object may be used to determine an acceleration of an object. If the magnitude of the velocity vectors is increasing, it may be determined that the object is accelerating. And if the magnitude of the velocity vectors is decreasing, it may be determined that the object is decelerating. In further examples, an object may be accelerating in certain directions and/or rotational directions while decelerating in others. In additional examples, other properties of the object's motion, such as momentum or angular momentum, may be determined as well or instead.

Figure 4G:
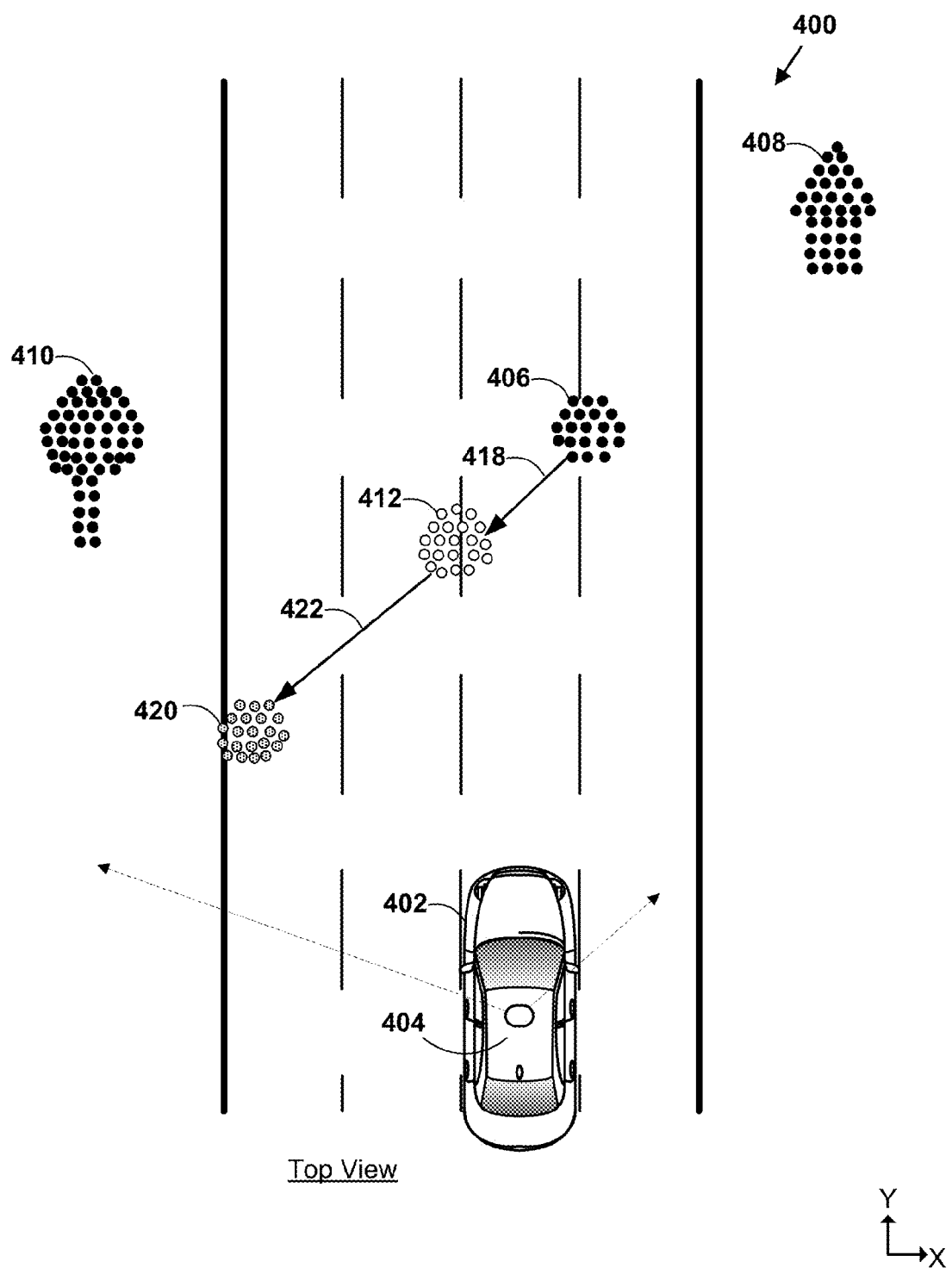
FIG. 4G is a schematic illustration of using two transformations to determine an acceleration of an object, according to an example embodiment.

FIG. 4G shows the determination of an acceleration of an object based on two transformations, according to an example embodiment. As shown, a first transformation between a first point cloud 406 representing an object and a second point cloud 412 representing the same object may be determined, resulting in a vector 418. By dividing the magnitude of the vector 418 by a time difference between when the first point cloud 406 and the second point cloud 412 were received, a first velocity vector may be determined. Additionally, a second transformation between the second point cloud 412 and a third point cloud 420 resulting from scanning of the environment 400 during a third time period may also be determined, resulting in a vector 422. By dividing the magnitude of the vector 422 by a time difference between when the second point cloud 412 and the third point cloud 420 were received (which may or may not be the same as the first time difference), a second velocity vector may be determined. An acceleration of the object may then be determined based on the difference between the first velocity vector and the second velocity vector. For instance, as shown in FIG. 4G, the second velocity vector may have a greater magnitude (assuming the time differences between when the points were detected are the same), which may indicate the object is accelerating.

In some examples, multiple objects may be moving simultaneously within an environment. Example systems and methods may be used to simultaneously determine movements of each of the objects (e.g., for purposes of avoiding each of the objects). Additionally, some other objects may be stationary within the environment, and it may not be known in advance which objects will be moving and which will not be moving. In some examples, the same methodology may also be used on stationary objects as well (e.g., to determine that the objects have no velocity and/or to determine that the objects have a certain fixed position within the environment).

In further examples, one or more of the determined point cloud representations of objects may be used to facilitate predicting if an object's path may cross a vehicle's path. For instance, the point clouds may be used to determine contour outlines shaped to fit to the 3D form of objects in the environment. The contour outlines may then be used to perform accurate checks to determine if an autonomous vehicle is likely to hit an object. By using point clouds (and associated contour outlines), these checks may be performed more accurately than in methods that abstract objects into boxes or triangles, for example.

In some examples, the methods for determining movements of objects may be used as part of a backup or failsafe system. For example, an autonomous vehicle may contain a number of different depth sensors, such as RADAR units, LIDAR units, or cameras. An example method for determining movements of objects may be run separately using sensor data from each of one or more of the sensors. Based on the results of the method from any one of the groups of sensor data, a separate notification signal may be sent to the autonomous vehicle. Redundancy may therefore be used by example systems in order to avoid objects with a high degree of confidence.

Example methods, such as method 300 of FIG. 3 may be carried out in whole or in part by a vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Additionally, example methods, such as method 300, may be carried out by other types of systems as well. For instance, a different type of vehicle or a driver instructing system may use an example method to follow moving and/or stationary objects within an environment. Other types of systems may benefit from using examples methods as well. For example, a robot such as a factory robot containing one or more depth sensors of its environment may use example methods to determine movements of objects for a number of different purposes as well.

Figure 5:
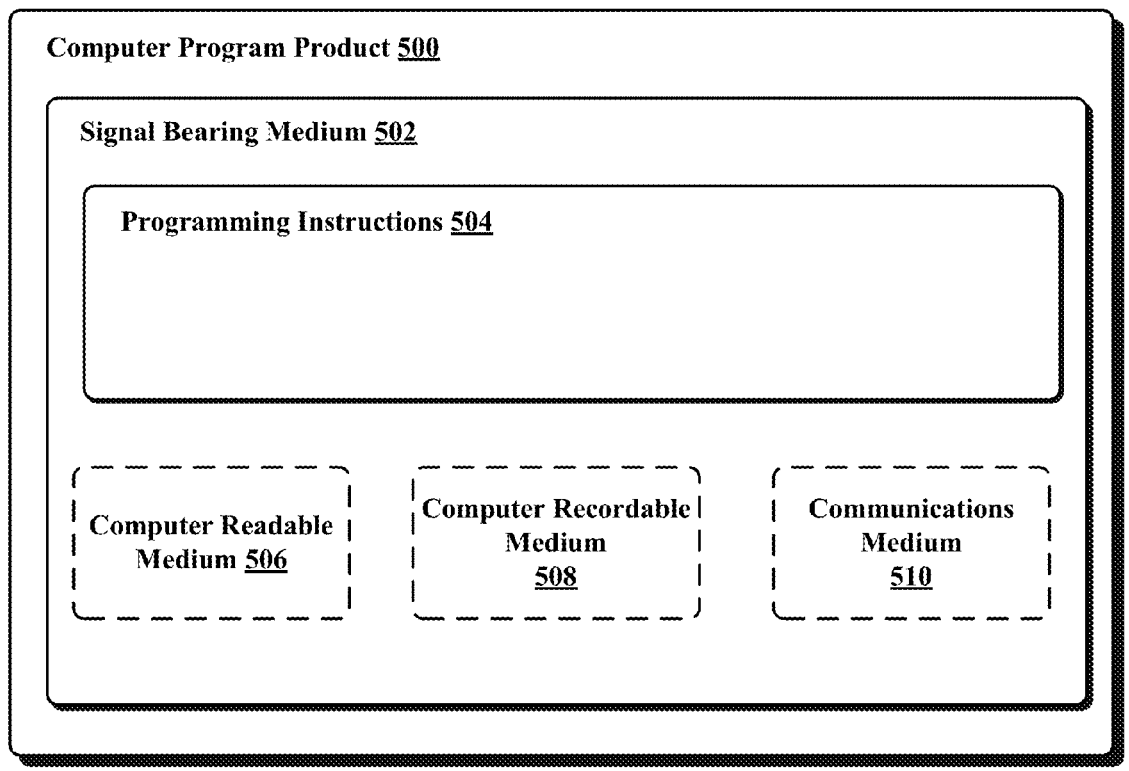
FIG. 5 is a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored in the memory 114 of the computer system 111 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 111 of FIG. 1 may be configured to provide various operations, functions, or actions in response to the programming instructions 504 conveyed to the computer system 111 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A computer-implemented method, comprising:
receiving a first set of points based on detection of an environment of an autonomous vehicle by one or more sensors on the autonomous vehicle during a first time period;
selecting a plurality of points from the first set of points that form a first point cloud representing an object in the environment;
receiving a second set of points based on detection of the environment by the one or more sensors on the autonomous vehicle during a second time period, wherein the second time period is after the first period;
selecting a plurality of points from the second set of points that form a second point cloud representing the object in the environment;
determining, by a control system of the autonomous vehicle, a transformation between the selected points from the first set of points that form the first point cloud representing the object in the environment and the selected points from the second set of points that form the second point cloud representing the object in the environment;
using the transformation to determine a velocity of the object; and
controlling the autonomous vehicle based at least in part on the velocity of the object.

2. The method of claim 1, wherein using the transformation to determine the velocity of the object comprises determining at least one of a position and a heading of the object.

3. The method of claim 1, further comprising before selecting the plurality of points from the first set of points, filtering the first set of points to remove one or more points generated based on detection of a ground surface in the environment.

4. The method of claim 1, wherein selecting the plurality of points from the first set of points that form the first point cloud representing the object comprises selecting points such that adjacent selected points have a pairwise distance that is less than a threshold distance.

5. The method of claim 1, wherein determining the transformation comprises determining a translation and a rotation between the selected points from the first set of points and the selected points from the second set of points so as to minimize a distance between selected points from the first set of points and associated points from the second set of points.

6. The method of claim 1, further comprising providing instructions to control the autonomous vehicle so as to avoid the object.

7. The method of claim 6, wherein providing instructions to control the autonomous vehicle so as to avoid the object comprises determining a plurality of contour outlines representing the object based on at least one of the first point cloud and the second point cloud.

8. The method of claim 1, further comprising:
receiving a third set of points based on detection of the environment during a third time period, wherein the third time period is after the second time period;
selecting a plurality of points from the third set of points that form a third point cloud representing the object in the environment;
determining a transformation between the selected points from the second set of points and the selected points from the third set of points; and
using the transformation between the selected points from the first set of points and the selected points from the second set of points and the transformation between the selected points from the second set of points and the selected points from the third set of points to determine an acceleration of the object.

9. The method of claim 1, further comprising:
selecting a plurality of points from the first set of points that form point cloud representations of one or more additional objects in the environment;
selecting a plurality of points from the second set of points that form point cloud representations of the one or more additional objects in the environment;
determining a transformation between the selected points from the first set of points and the selected from the second set of points for the one or more additional objects; and
using the transformation to determine a velocity of the one or more additional objects.

10. An autonomous vehicle, comprising:
one or more depth sensors; and
a control system configured to:
receive a first set of points based on detection of an environment by the one or more depth sensors on the autonomous vehicle during a first time period;
select a plurality of points from the first set of points that form a first point cloud representing an object in the environment;
receive a second set of points based on detection of the environment by the one or more depth sensors during a second time period, wherein the second time period is after the first time period;
select a plurality of points from the second set of points that form a second point cloud representing the object in the environment;
determine a transformation between the selected points from the first set of points that form the first point cloud representing the object in the environment and the selected from the second set of points that form the second point cloud representing the object in the environment;
use the transformation to determine a velocity of the object; and
control the autonomous vehicle based at least in part on the velocity of the object.

11. The vehicle of claim 10, wherein the control system is configured to determine the velocity of the object by determining at least one of a position and a heading of the object.

12. The vehicle of claim 10, wherein the control system is further configured to before selecting the plurality of points from the first set of points, filter the first set of points to remove one or more points generated based on detection of a ground surface in the environment.

13. The vehicle of claim 10, wherein the control system is further configured to provide instructions to control the vehicle so as to avoid the object.

14. The vehicle of claim 10, wherein the control system is further configured to:
receive the first set of points in the environment from one of a plurality of depth sensors on the vehicle; and
provide instructions to control the vehicle so as to avoid the object based on sensor data from any one of the plurality of depth sensors.

15. The vehicle of claim 10, wherein the control system is further configured to:
receive a third set of points based on detection of the environment during a third time period by the depth sensor, wherein the third time period is after the second time period;
select a plurality of points from the third set of points that form a third point cloud representing the object in the environment;
determine a transformation between the selected points from the second set of points and the selected from the third set of points; and
use the transformation between the selected points from the first set of points and the selected points from the second set of points and the transformation between the selected points from the second set of points and the selected points from the third set of points to determine an acceleration of the object.

16. The vehicle of claim 10, wherein the control system is further configured to:
select a plurality of points from the first set of points that form point cloud representations of one or more additional objects in the environment;
select a plurality of points from the second set of points that form point cloud representations of the one or more additional objects in the environment;
determine a transformation between the selected points from the first set of points and the selected points from the second set of points for the one or more additional objects; and
use the transformation to determine a velocity of the one or more additional objects.

17. A non-transitory computer readable medium having stored therein instructions, that when executed by a control system of an autonomous vehicle, cause the control system to perform functions comprising:
receiving a first set of points based on detection of an environment of the autonomous vehicle by one or more sensors on the autonomous vehicle during a first time period;
selecting a plurality of points from the first set of points that form a first point cloud representing an object in the environment;
receiving a second set of points based on detection of the environment by the one or more sensors on the autonomous vehicle during a second time period, wherein the second time period is after the first period;
selecting a plurality of points from the second set of points that form a second point cloud representing the object in the environment;
determining a transformation between the selected points from the first set of points that form the first point cloud representing the object in the environment and the selected points from the second set of points that form the second point cloud representing the object in the environment;
using the transformation to determine a velocity of the object; and
controlling the autonomous vehicle based at least in part on the velocity of the object.

18. The non-transitory computer readable medium of claim 17, wherein using the transformation to determine the velocity of the object comprises determining at least one of a position and a heading of the object.

19. The non-transitory computer readable medium of claim 17, further comprising providing instructions, that when executed by the computing system, cause the computing system to perform a function comprising:
controlling the autonomous vehicle so as to avoid the object.

* * * * *